(12) United States Patent
Tu et al.

(10) Patent No.: US 8,813,115 B2
(45) Date of Patent: Aug. 19, 2014

(54) SERVICE ACCESS METHOD, DEVICE, AND SYSTEM

(71) Applicant: Huawei Technologies Co., Ltd., Guangdong (CN)

(72) Inventors: Cong Tu, Nanjing (CN); Yu Qin, Nanjing (CN); Junjun Song, Nanjing (CN); Hancheng Ding, Nanjing (CN); Yan Zheng, Nanjing (CN); Yinhe Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/626,689

(22) Filed: Sep. 25, 2012

(65) Prior Publication Data
US 2013/0132995 A1    May 23, 2013

(30) Foreign Application Priority Data

Nov. 21, 2011    (CN) .......................... 2011 1 0371516

(51) Int. Cl.
*H04N 7/16* (2011.01)
*G06F 3/00* (2006.01)

(52) U.S. Cl.
USPC ................. 725/25; 725/38; 725/54; 725/143; 725/148

(58) Field of Classification Search
CPC ..... H04N 21/25; H04N 21/254; H04N 21/64; H04N 21/6405
USPC ................ 725/25, 38, 54, 143, 148
See application file for complete search history.

(56) References Cited

U.S. PATENT DOCUMENTS

| | | | |
|---|---|---|---|
| 2004/0098448 A1* | 5/2004 | Fukushima et al. | 709/201 |
| 2006/0233171 A1* | 10/2006 | Murray et al. | 370/390 |
| 2007/0076716 A1* | 4/2007 | Jang | 370/390 |
| 2007/0253409 A1 | 11/2007 | Fu et al. | |
| 2010/0027542 A1 | 2/2010 | Huang et al. | |
| 2010/0322235 A1* | 12/2010 | Mehta et al. | 370/352 |
| 2011/0280241 A1* | 11/2011 | Field | 370/390 |
| 2012/0207019 A1* | 8/2012 | Baykal et al. | 370/230 |

FOREIGN PATENT DOCUMENTS

| | | |
|---|---|---|
| CN | 1674550 A | 9/2005 |
| CN | 1859179 A | 11/2006 |
| CN | 101197821 A | 6/2008 |
| CN | 101207474 A | 6/2008 |

(Continued)

OTHER PUBLICATIONS

"Open IPTV Forum—Functional Architecture—V 1.1," 2007, Members of the Open IPTV Forum, Valbonne, France.

*Primary Examiner* — Nasser Goodarzi
*Assistant Examiner* — Kyu Chae
(74) *Attorney, Agent, or Firm* — Leydig, Voit & Mayer, Ltd.

(57) ABSTRACT

The present invention provides a service access method, device, and system, and relates to the field of television services, to guarantee multicast security of a network device. The method includes: obtaining an authorized multicast address list according to program channel list information provided by a server; receiving an Internet Group Management Protocol IGMP packet request sent by a user terminal device, where the IGMP packet request carries a multicast address; verifying the multicast address in the IGMP packet request according to the multicast address list; and sending a media data stream corresponding to the verified multicast address to the user terminal device. The solutions of the present invention are suitable for realizing the security of multicast of network device.

6 Claims, 7 Drawing Sheets

(56) References Cited

FOREIGN PATENT DOCUMENTS

| | | |
|---|---|---|
| CN | 101321073 A | 12/2008 |
| CN | 101808256 A | 8/2010 |
| EP | 1424806 A1 | 6/2004 |
| EP | 1424807 A1 | 6/2004 |
| WO | WO 2005015782 A1 | 2/2005 |
| WO | WO 2009106126 A1 | 9/2009 |

* cited by examiner

SERVICE ACCESS METHOD, DEVICE, AND SYSTEM

CROSS-REFERENCE TO RELATED APPLICATION

This application claims priority to Chinese Patent Application No. 201110371516.3, filed on Nov. 21, 2011, which is hereby incorporated by reference in its entirety.

FIELD OF THE INVENTION

The present invention relates to the field of the television services, and in particular, to a service access method, device, and system.

BACKGROUND OF THE INVENTION

The Internet Protocol television (IPTV) service solves the problem that users are constrained by the schedule of television programs, meets the demands of users for watching television programs freely, and provides powerful interactive functions.

During the use of the IPTV service, a television terminal first needs to access a broadband network with a set-top box (STB), and then the STB sends, to an IPTV server, a request to access an IPTV system, and the IPTV server authenticates and authorizes a user, and returns a registry success message when the authentication is successful. After the successful registry of the user, the STB can obtain, from the IPTV server, a media program channel information list. The STB sends, according to the channel list, an Internet Group Management Protocol (IGMP) packet request corresponding to a multicast group address to apply, to a network device, for joining a multicast channel to which a media stream belongs. Subsequently, after the data stream corresponding to the channel reaches the user terminal, the programs can be normally watched.

Conventionally, when virus attack or an illegally-constructed IGMP packet request occurs on a terminal device on a user side, the multicast table of an intermediate network device might be exhausted, resulting in that legal users cannot operate normally.

SUMMARY OF THE INVENTION

The embodiments of the present invention provide a service access method, device, and system, so as to guarantee the multicast security of a network device.

In order to achieve the foregoing objective, the embodiments of the present invention adopt the following technical solutions.

A service access method includes: obtaining, by a network device, a multicast address list according to program channel list information sent by an IPTV server; receiving, by the network device, an IGMP packet request sent by a user terminal device, wherein the IGMP packet request carries a multicast address; verifying, by the network device, the multicast address in the IGMP packet request according to the multicast address list, wherein if an item in the multicast address list matches the multicast address in the IGMP packet request, the multicast address in the IGMP packet request passes the verification; and sending, by the network device, the data stream information corresponding to the multicast address that passes the verification to the user terminal device.

A network device includes: an obtaining unit, configured to obtain a multicast address list according to program channel list information returned by an IPTV server; a first receiving unit, configured to receive an IGMP packet request sent by a user terminal device, wherein the IGMP packet request carries a multicast address; a verification unit, configured to verify the multicast address in the IGMP packet request according to the multicast address list, wherein if an item in the multicast address list matches the multicast address in the IGMP packet request, the multicast address in the IGMP packet request passes the verification; a first sending unit, configured to send the data stream information corresponding to the multicast address that passes the verification to the user terminal device.

A service access system includes: a network device and a parsing device; wherein the network device is configured to send, to the parsing device, program channel list information returned by an Internet Protocol television (IPTV) server; receive the multicast address list returned by the parsing device; receive an Internet Group Management Protocol (IGMP) packet request sent by a user terminal device, wherein the IGMP packet request carries a multicast address; verify the multicast address in the IGMP packet request according to the multicast address list, wherein if an item in the multicast address list matches the multicast address in the IGMP packet request, the multicast address in the IGMP packet request passes the verification; and send the data stream information corresponding to the multicast address that passes the verification to the user terminal device; the parsing device is configured to parse the program channel list information to obtain all multicast addresses, generate a multicast address list by using all the multicast addresses, and send the generated multicast address list to the network device.

A service access system, comprising: a network device and a parsing device; wherein the network device is configured to send, to the parsing device, program channel list information returned by an Internet Protocol television (IPTV) server; receive multicast addresses returned by the parsing device; generate the multicast address list by using all the received multicast addresses; receive an Internet Group Management Protocol (IGMP) packet request sent by a user terminal device, wherein the IGMP packet request carries a multicast address; verify the multicast address in the IGMP packet request according to the multicast address list, wherein if an item in the multicast address list matches the multicast address in the IGMP packet request, the multicast address in the IGMP packet request passes the verification; and send the data stream information corresponding to the multicast address that passes the verification to the user terminal device; the parsing device is configured to parse the program channel list information to obtain all multicast addresses, and send all the multicast addresses to the network device.

The embodiments of the present invention provide a service access method, device, and system, in which a network device obtains a multicast address list according to service request response information returned by a server, when receiving an IGMP packet request sent by a user terminal device, the network device verifies, according to the multicast address list, a multicast address carried in the IGMP packet request, and receives and forwards a data stream corresponding to the multicast address that passes the verification. In this way, the network device can filter an illegal IGMP packet request to guarantee the security of multicast of network device, thereby further guaranteeing the normal operations of legal users.

BRIEF DESCRIPTION OF THE DRAWINGS

To illustrate the technical solutions according to the embodiments of the present invention more clearly, the accompanying drawings required for describing the embodiments are introduced below briefly. Apparently, the accompanying drawings in the following description merely show some of the embodiments of the present invention, and a person having ordinary skill in the art can obtain other drawings according to the accompanying drawings without creative efforts.

DETAILED DESCRIPTION OF THE EMBODIMENTS

The technical solutions of the present invention will be clearly and completely described in the following with reference to the accompanying drawings. It is obvious that the embodiments to be described are only a part rather than all of the embodiments of the present invention. All other embodiments obtained by a person skilled in the art based on the embodiments of the present invention without creative efforts shall fall within the protection scope of the present invention.

Figure 1:
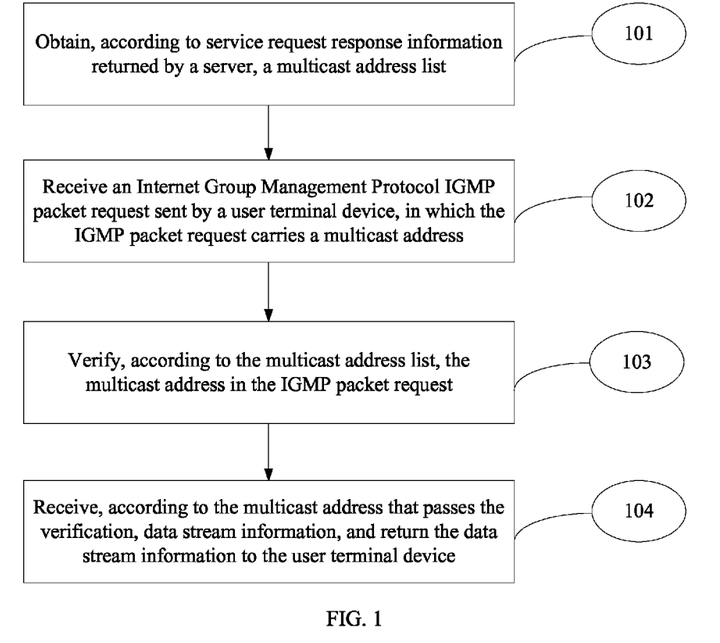
FIG. 1 is a flow chart of a service access method according to an embodiment of the present invention.

An embodiment of the present invention provides a service access method. As shown in FIG. 1, the method includes the following steps.

101: Obtain a multicast address list according to service request response information returned by a server.

Specifically, if a network device is not connected to a parsing device, the network device first parses the service request response information to obtain multicast addresses, and generates a multicast address list by using all the parsed multicast addresses.

If a network device is connected to a parsing device, the network device first sends the service request response information returned by the server to the parsing device, and the parsing device receives and parses the service request response information. After parsing all multicast addresses, the parsing device generates a multicast address list by using all the multicast addresses, and returns the multicast address list to the network device. Alternatively, the parsing device returns all the parsed multicast addresses to the network device, and the network device generates a multicast address list by using all the received multicast addresses.

If user terminal devices have different permissions, the network device obtains different multicast address lists according to the service request response information that has different permissions and is returned by a server. The network device only obtains one multicast address list corresponding to the service request response information of each permission. The network device can also obtain a multicast address list according to the service request response information returned by a server to each of user terminal devices, that is, the network device obtains one multicast address list for each user terminal device, which is not limited in the embodiment of the present invention.

Description is given by taking an example in which the network device obtains different multicast address lists according to the service request response information that has different permissions and is returned by a server, and the network device obtains only one multicast address list corresponding to the service request response information of each permission.

102: Receive an Internet Group Management Protocol IGMP packet request sent by the user terminal device, in which the IGMP packet request carries a multicast address.

103: Verify the multicast address in the IGMP packet request according to the multicast address list.

Specifically, the network device receives the IGMP packet request, parses the IGMP packet request to obtain a multicast address, and compares the multicast address with a multicast address in a multicast address list of a corresponding permission to verify whether the multicast address in the IGMP packet request is legal. If it is verified that the multicast address in the IGMP packet request is legal, proceed to step 104; and if it is verified that the multicast address in the IGMP packet request is illegal, discard the IGMP packet.

104: Receive data stream information according to the multicast address that passes the verification, and return the data stream information to the user terminal device.

The data stream corresponding to the multicast address that passes the verification is received, and the information of the data stream is sent to a corresponding user terminal device.

The embodiment of the present invention provides a service access method, in which a multicast address list is obtained according to service request response information returned by a server, when an IGMP packet request sent by a user terminal device is received, and according to the multicast address list, the multicast address carried in the IGMP packet request is verified, and the data stream corresponding to the multicast address that passes the verification is received and forwarded. In this way, the network device can filter an illegal IGMP packet request, to guarantee the security of multicast of network device, thereby further guaranteeing the normal operations of legal users.

IPTV service access is taken as an example in the following for specific description.

Figure 2:
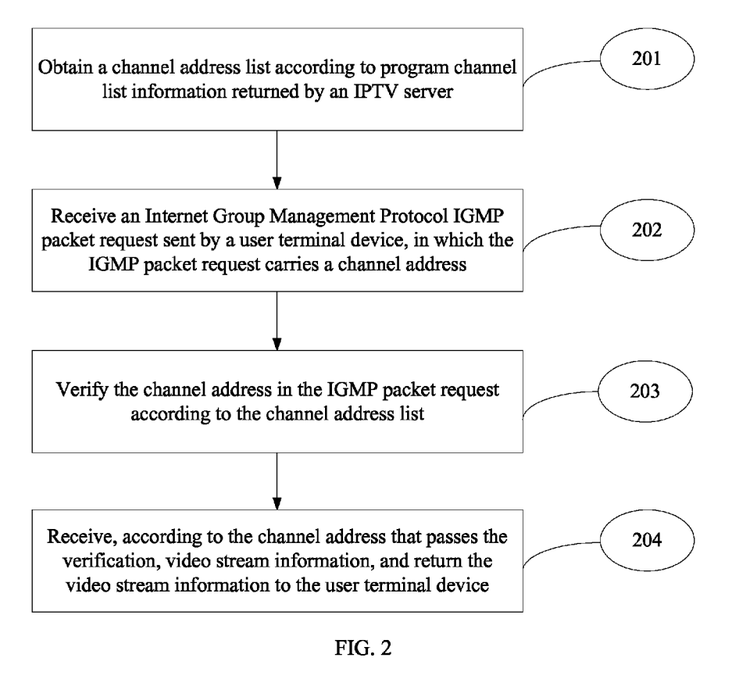
FIG. 2 is a flow chart of an IPTV service access method according to an embodiment of the present invention.

An embodiment of the present invention provides an IPTV service access method. As shown in FIG. 2, the method includes the following steps.

201: Obtain a channel address list according to program channel list information returned by an IPTV server.

Specifically, if a network device is not connected to a parsing device, the network device first parses the program channel list information returned by the IPTV server to obtain multicast addresses, and then generates a channel address list by using all the parsed channel addresses.

If a network device is connected to a parsing device, the network device first sends, to the parsing device, the program channel list information returned by the IPTV server. The parsing device receives the program channel list information and parses the program channel list information to obtain all channel addresses, generates a channel address list by using all the channel addresses, and sends the channel address list to the network device. The network device receives the channel address list.

Alternatively, a network device is connected to a parsing device, the network device first sends, to the parsing device, the program channel list information returned by the IPTV server. The parsing device receives the program channel list information and parses the program channel list information to obtain all channel addresses, sends all the parsed channel addresses to the network device. The network device receives the channel addresses, and generates a channel address list by using all the received channel addresses.

When the network device is connected to the parsing device, the network device does not need to parse the specific implementation packets of respective IPTV server of various media carriers, but it is only needed to receive the channel address list or the channel addresses.

The specific implementation packets of respective IPTV servers of various media carriers are different, that is, the format of the packet sent by each IPTV server is different, and the meaning of each field is different. To parse the program channel list information returned by the IPTV server to obtain a channel address, a specific field of the channel address in the program channel list information which is a packet should be first determined.

202: Receive an Internet Group Management Protocol IGMP packet request sent by a user terminal device, in which the IGMP packet request carries a channel address.

The user terminal device generally refers to a set-top box.

Specifically, a user selects a television channel to watch, sends a watch request to the user terminal device. The user terminal device receives the watch request of the user, adds the channel address of the television channel that the user selects to watch into the IGMP packet request, and sends the IGMP packet request to the network device. The network device receives the IGMP packet request and parses the IGMP packet request to obtain the carried channel address.

203: Verify the channel address in the IGMP packet request according to the channel address list.

Specifically, after parsing the IGMP packet request to obtain the channel address carried in the request, the network device compares the channel address with a channel address in the obtained channel address list of a corresponding permission. If an item in the channel address list matches the channel address in the IGMP packet request, that is, the verification is passed, receive video stream information corresponding to the channel address, that is, initiate step 204. In the embodiment of the present invention, the matching item may be an item in the channel address list that is the same as the channel address in the IGMP packet request.

If no item in the channel address list matches the channel address in the IGMP packet request, the network device discards the IGMP packet request. In this way, a malicious IGMP packet is effectively filtered.

204: Receive video stream information according to the channel address that passes the verification, and return the video stream information to the user terminal device.

Specifically, the network device receives, according to the channel address that passes the verification, the video stream information corresponding to the channel address, and sends the video stream information to the user terminal device.

In the method provided by the embodiment of the present invention, the network device can filter an illegal IGMP packet request, to guarantee the security of multicast of network device, thereby further guaranteeing the normal services of legal users.

Figure 3:
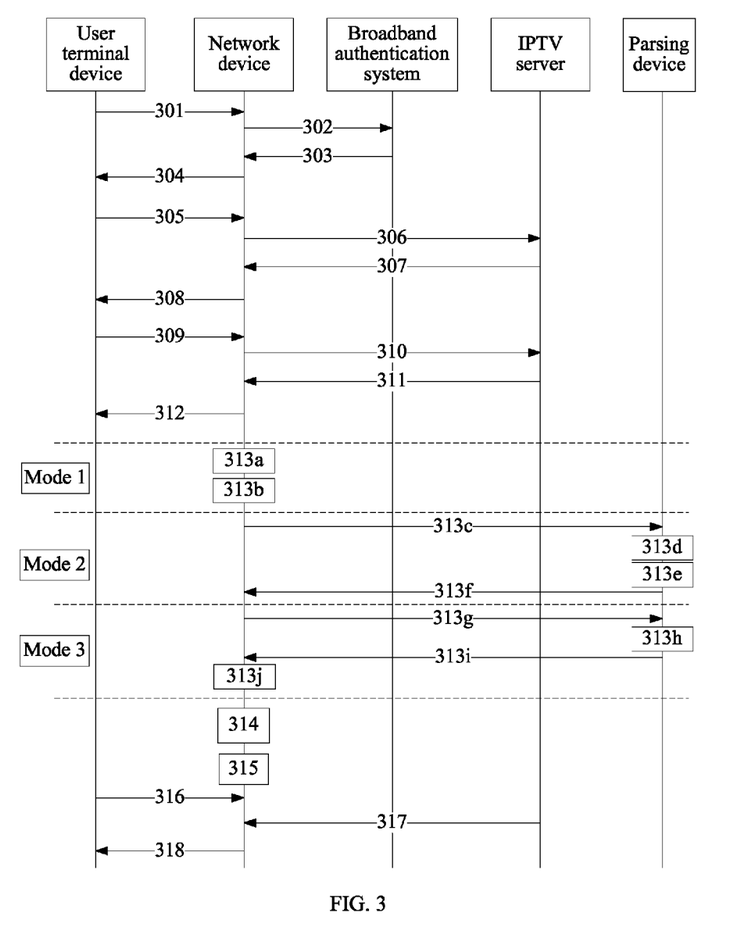
FIG. 3 is a schematic view of an IPTV service access method according to an embodiment of the present invention.

An embodiment of the present invention further provides a specific IPTV service access method. As shown in FIG. 3, the method includes the following steps.

301: A user terminal device sends a broadband authentication request to a network device, and the network device receives the broadband authentication request.

302: After the network device receiving the broadband authentication request, the network device sends the request to a broadband authentication system, and the broadband authentication system receives the broadband authentication request.

303: The broadband authentication system processes the broadband authentication request, and then sends authentication result information to the network device.

The broadband authentication system receives the broadband authentication request, and then verifies the broadband authentication request. If the verification succeeds, the user terminal device that sends the broadband authentication request is connected to a broadband system, and broadband network access success information is sent; and if the verification fails, failure information is sent.

304: The network device sends the verification result information to the user terminal device.

305: After the user terminal device receives the verification result information, the user terminal device sends login information to the network device, and the network device receives the login information, where the login information carries an account and a password.

After the user terminal device receives the broadband network access success information, the user terminal device generates login information, and sends the login information to the network device, in which the login information carries the account and the password.

306: After receiving the login information, the network device sends the login information to an IPTV server.

307: After the IPTV server receives and verifies the login information, the IPTV server sends login response information to the network device, and the network device receives the login response information.

After the IPTV server receives the login information, the IPTV server verifies whether the account and the password carried in the login information are correct; if the account and the password are correct, that is, the verification succeeds, the IPTV server sends page browsing information provided by the IPTV server to the network device; and if the account and the password are incorrect, that is, the verification fails, the IPTV server sends login failure information to the network device.

308: After receiving the login response information, the network device sends the information to the user terminal device.

309: After the login succeeds, the user terminal device sends a program channel list request to the network device, and the network device receives the request.

Specifically, the user terminal device receives the login response information sent by the network device, in which the login response information carries the page browsing information provided by the IPTV server; and then the user terminal device generates a program channel list request and sends the request to the network device.

310: The network device sends the program channel list request to the IPTV server.

311: The IPTV server sends authorized program channel list information to the network device.

312: The IPTV server sends, to the user terminal device, the authorized program channel list information returned by the IPTV server.

The network device can obtain, according to the program channel list information returned by the IPTV server, the channel address list by specifically adopting any one of the following three modes.

Mode 1: Refer to steps 313*a* to 313*b*, and in this mode, the network device generates the channel address list.

313a: The network device parses the program channel list information returned by the IPTV server to obtain all channel addresses.

313b: The network device generates the channel address list by using all the parsed channel addresses.

Mode 2: Refer to steps 313c to 313f, and in this mode, a parsing device connected to the network device generates the channel address list.

313c: The network device sends, to the parsing device, the program channel list information returned by the IPTV server.

313d: The parsing device parses the program channel list information to obtain all channel addresses.

313e: The parsing device generates the channel address list by using all the channel addresses.

313f: The parsing device sends the generated channel address list to the network device, and the network device receives the channel address list returned by the parsing device.

Mode 3: Refer to steps 313g to 313j, and in this mode, the network device generates the channel address list, and the network device is connected to a parsing device.

313g: The network device sends, to the parsing device, the program channel list information returned by the IPTV server.

313h: The parsing device parses the program channel list information to obtain all channel addresses.

313i: The parsing device sends all the parsed channel addresses to the network device.

313j: The network device receives the channel addresses, and generates the channel address list by using all the received channel addresses.

314: The network device stores the channel address list obtained by using any one of the foregoing three modes.

315: The network device receives an Internet Group Management Protocol IGMP packet request sent by the user terminal device, in which the IGMP packet request carries a channel address.

316: The network device verifies the channel address in the IGMP packet request according to the channel address list stored in step 314.

317: The network device receives video stream information according to the channel address that passes the verification.

318: The network device returns, to the user terminal device, the video stream information received in step 317.

It should be noted that the foregoing steps are not subjected to the order mentioned.

In the embodiment of the present invention, the foregoing service access method is applicable to any service in which a multicast address is first obtained by using an interactive authentication method and then data is forwarded in a multicast manner according to the multicast address, such as a multimedia conference, data copy, and real-time data multicast, which is not limited in the present invention.

The embodiment of the present invention provides a method, in which a network device obtains a channel address list according to program channel list information returned by an IPTV server, when receiving an IGMP packet request sent by a user terminal device, verifies, according to the channel address list, the channel address carried in the IGMP packet request, receives video stream information corresponding to the channel address that passes the verification, and forwards the video stream information to the user terminal device. In this way, the network device can filter an illegal IGMP packet request, to guarantee the security of multicast of network device, thereby further guaranteeing the normal services of legal users.

Figure 4:
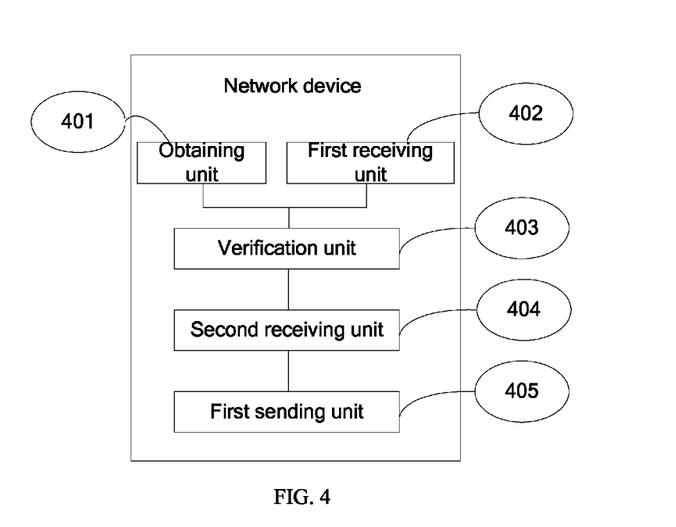
FIG. 4 is a schematic structural view of a network device according to an embodiment of the present invention.

As shown in FIG. 4, an embodiment of the present invention provides a network device, which includes:

an obtaining unit 401, configured to obtain a multicast address list according to service request response information returned by a server.

Figure 5:
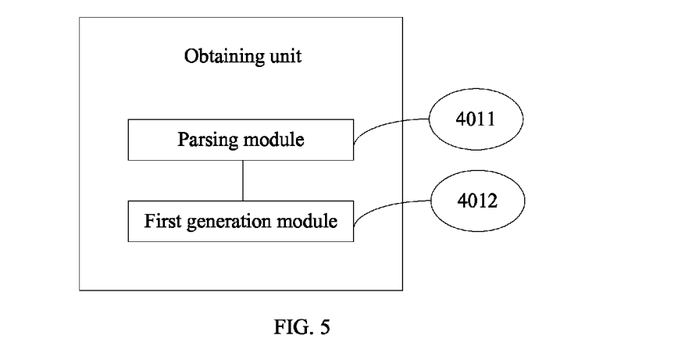
FIG. 5 is a schematic structural view of an obtaining unit of the network device shown in FIG. 4.

Optionally, if a network device is not connected to a parsing device, as shown in FIG. 5, the obtaining unit 401 includes:

a parsing module 4011, configured to parse the service request response information returned by the server to obtain all multicast addresses; and a first generation module 4012, configured to generate a multicast address list by using all the parsed multicast addresses.

Figure 6:
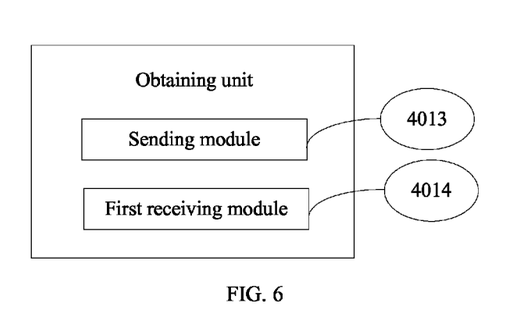
FIG. 6 is another schematic structural view of an obtaining unit of the network device shown in FIG. 4.

Optionally, if a network device is connected to a parsing device, as shown in FIG. 6, the obtaining unit 401 includes:

a sending module 4013, configured to send, to the parsing device, the service request response information returned by the server; and a first receiving module 4014, configured to receive a multicast address list returned by the parsing device.

Figure 7:
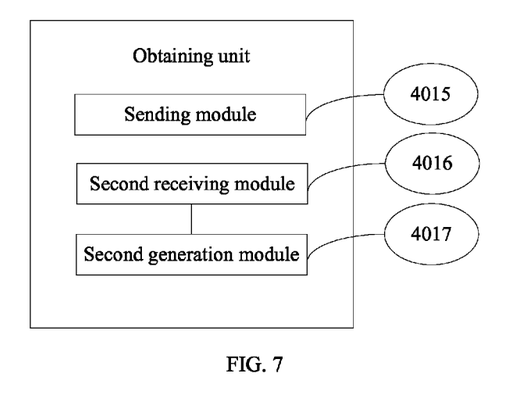
FIG. 7 is another schematic structural view of an obtaining unit of the network device shown in FIG. 4.

Optionally, if a network device is connected to a parsing device, as shown in FIG. 7, the obtaining unit 401 includes:

a sending module 4015, configured to send, to the parsing device, the service request response information returned by the server;

a second receiving module 4016, configured to receive multicast addresses returned by the parsing device; and a second generation module 4017, configured to generate a multicast address list according to all the received multicast addresses.

The network device further includes:

a first receiving unit 402, configured to receive an Internet Group Management Protocol IGMP packet request sent by a user terminal device, in which the IGMP packet request carries a multicast address.

a verification unit 403, configured to verify the multicast address in the IGMP packet request according to the multicast address list;

a second receiving unit 404, configured to receive data stream information according to the multicast address that passes the verification; and a first sending unit 405, configured to return the received data stream information to the user terminal device.

Figure 8:
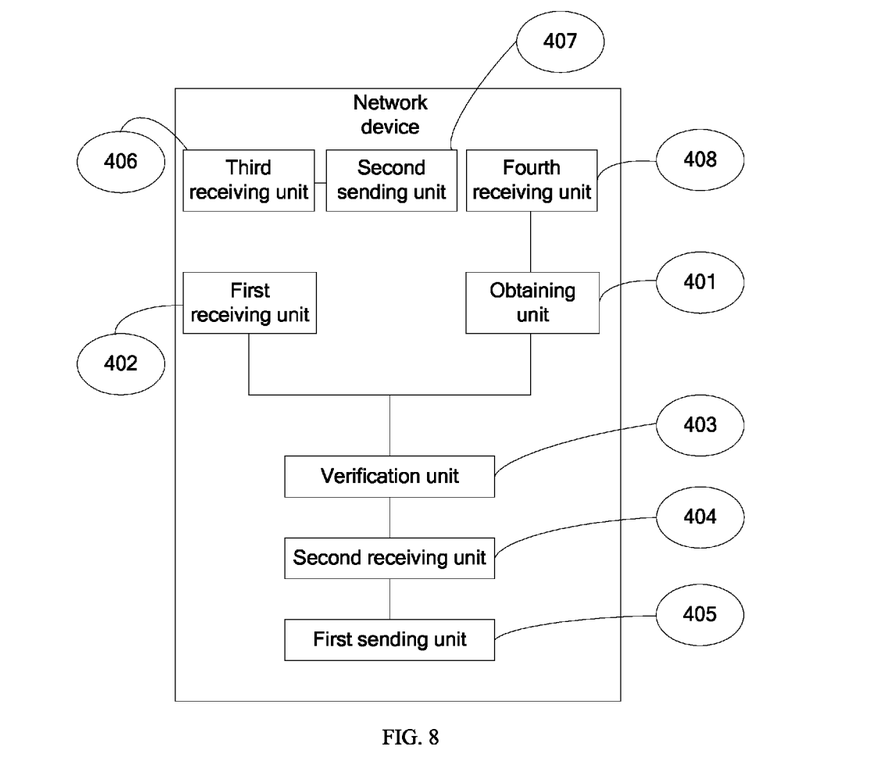
FIG. 8 is a schematic structural view of another network device according to an embodiment of the present invention.

Furthermore, as shown in FIG. 8, the network device can further include:

a third receiving unit 406, configured to receive service request information sent by the user terminal device;

a second sending unit 407, configured to send the service request information to the server; and a fourth receiving unit 408, configured to receive the service request response information returned by the server.

The network device is applied to IPTV service access, and referring to FIG. 4, the network device specifically includes:

the obtaining unit 401, specifically configured to obtain a channel address list according to program channel list information returned by an IPTV server.

Optionally, if the network device is not connected to a parsing device, referring to FIG. 5, the obtaining unit 401 includes:

the parsing module 4011, configured to parse the program channel list information returned by the IPTV server to obtain all channel addresses; and the first generation module 4012, configured to generate a channel address list by using all the parsed channel addresses.

Optionally, if the network device is connected to a parsing device, referring to FIG. 6, the obtaining unit 401 includes:

the sending module 4013, configured to send, to the parsing device, program channel list information returned by the IPTV server; and the receiving module 4014, configured to receive a channel address list returned by the parsing device.

Optionally, if the network device is connected to a parsing device, referring to FIG. 7, the obtaining unit 401 includes:

the sending module 4015, configured to send, to the parsing device, the program channel list information returned by the IPTV server; and the second receiving module 4016, configured to receive channel addresses returned by the parsing device; and the second generation module 4017, configured to generate a channel address list according to all the received channel addresses.

The network device further includes:

the first receiving unit 402, configured to receive an Internet Group Management Protocol IGMP packet request sent by the user terminal device, in which the IGMP packet request carries a channel address;

the verification unit 403, configured to verify the channel address in the IGMP packet request according to the channel address list.

the second receiving unit 404, configured to receive video stream information according to the channel address that passes the verification; and the first sending unit 405, configured to return, to the user terminal device, the video stream information received by the second receiving unit 404.

Furthermore, referring to FIG. 8, the network device can further include:

the third receiving unit 406, configured to receive a program channel list request sent by the user terminal device;

the second sending unit 407, configured to send the program channel list request to the IPTV server; and the fourth receiving unit 408, configured to receive the program channel list information returned by the IPTV server.

The embodiments of the present invention provide a network device, in which the network device obtains a multicast address list according to service request response information returned by a server, and when receiving an IGMP packet request sent by a user terminal device, the network device verifies, according to the multicast address list, a multicast address carried in the IGMP packet request, and receives and forwards data stream information corresponding to the multicast address that passes the verification. In this way, the network device can filter an illegal IGMP packet request, to guarantee the security of multicast of network device, thereby further guaranteeing the normal operations of legal users.

Figure 9:
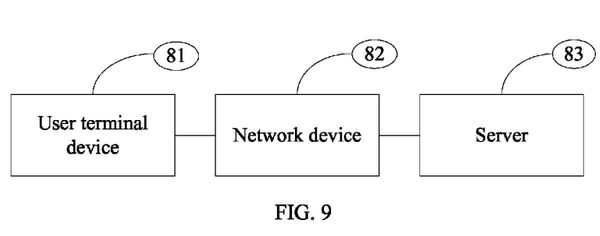
FIG. 9 is a schematic view of a service access system according to an embodiment of the present invention.

An embodiment of the present invention provides a service access system, as shown in FIG. 9, the system includes: a user terminal device 81, a network device 82, and a server 83. The network device 82 is the foregoing network device including the obtaining unit shown in FIG. 5.

Figure 10:
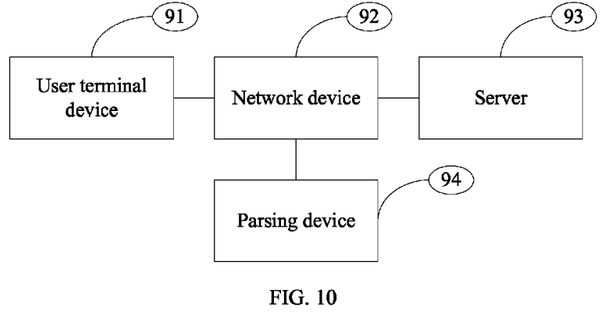
FIG. 10 is a schematic view of another service access system according to an embodiment of the present invention.

An embodiment of the present invention further provides a service access system, as shown in FIG. 10, the system includes: a user terminal device 91, a network device 92, a server 93, and a parsing device 94.

The parsing device 94 is configured to parse service request response information to obtain all multicast addresses, generate a multicast address list by using all the multicast addresses, and send the generated multicast address list to the network device 92.

Alternatively, the parsing device 94 is configured to parse service request response information to obtain all multicast addresses, and send all the parsed multicast addresses to the network device 92. The network device 92 generates a multicast address list by using all the received multicast addresses.

The network device 92 is the foregoing network device including the obtaining unit shown in FIG. 6 or FIG. 7.

The embodiments of the present invention provide a service access system, in which a network device obtains a multicast address list according to service request response information returned by a server, and when a user terminal device sends an IGMP packet request, the network device verifies, according to the multicast address list, a multicast addresses carried in the IGMP packet request, and receives and forwards data stream information corresponding to the multicast address that passes the verification. In this way, the network device can filter an illegal IGMP packet request, to guarantee the security of multicast of network device, thereby further guaranteeing the normal operations of legal users.

The foregoing description is merely about exemplary embodiments of the present invention, but not intended to limit the protection scope of the present invention. Any variation or replacement easily derived by a person skilled in the art within the technical scope disclosed by the present invention should fall within the protection scope of the present invention. Therefore, the protection scope of the present invention is subject to the protection scope of the claims.

What is claimed is:

1. A service access method for providing multicast television services, comprising:

obtaining, by a network device, an authorized multicast address list according to program channel list information provided by each Internet Protocol television (IPTV) server of various media carriers, the authorized multicast address list containing a plurality of multicast addresses in use for distributing corresponding media data streams, wherein the program channel list information is contained in a packet, the formats of packets sent by IPTV servers of different media carriers are different;

wherein the obtaining the authorized multicast address lists comprises:

sending, to a parsing device, the packets of different formats provided by the IPTV servers of the different media carriers;

receiving, by the parsing device, the packets of different formats;

determining, by the parsing device, a specific field of the multicast addresses in each of the packets of different formats, according to the format of the packet;

parsing, by the parsing device, each of the packets of different formats to obtain all channel addresses in each of the packets;

generating, by the parsing device, channel address lists according to all the channel addresses of each of the packets of different formats, and sending the channel address lists to the network device;

receiving, by the network device, the channel address lists and obtaining the authorized multicast address list according to the channel address lists;

receiving, by the network device, an Internet Group Management Protocol (IGMP) packet request sent by a user terminal device, wherein the IGMP packet request carries a multicast address;

verifying, by the network device, that the multicast address carried by the IGMP packet request is in the authorized multicast address list; and if the multicast address carried by the IGMP packet request is in the authorized multicast address list, sending, by the network device, a media data stream corresponding to the multicast address carried by the IGMP packet request to the user terminal device.

2. The service access method according to claim 1, the step of obtaining the authorized multicast address list comprises:

obtaining, by the network device, multiple authorized multicast address lists, wherein there are multiple user terminal devices, and one authorized multicast address list is obtained for only one user terminal device.

3. The service access method according to claim 1, the step of obtaining the authorized multicast address list comprises:

obtaining, by the network device, multiple authorized multicast address lists, wherein there are multiple user terminal devices, the user terminal devices have plurality permissions, and only one authorized multicast address list is obtained for each permission.

4. A service access system, comprising: a network device and a parsing device; wherein the network device is configured to send, to the parsing device, packets provided by Internet Protocol television (IPTV) servers of different media carriers; each of the packets contains program channel list information provided by each IPTV server of various media carriers, formats of the packets sent by IPTV servers of the different media carriers are different; receive channel address lists returned by the parsing device; obtain an authorized multicast address list according to the channel address lists, the authorized multicast address list containing a plurality of multicast addresses in use for distributing corresponding media data streams; receive an Internet Group Management Protocol (IGMP) packet request sent by a user terminal device, wherein the IGMP packet request carries a multicast address; verify that the multicast address carried by the IGMP packet request is in the authorized multicast address list; and if the multicast address carried by the IGMP packet request is in the authorized multicast address list, send a media data stream corresponding to the multicast address carried by the IGMP packet request to the user terminal device;

the parsing device is configured to determine a specific field of the multicast addresses in each of the received packets of different formats, according to the format of the packet; parse each of the packets of different formats to obtain all channel addresses in each of the packets, generate the channel address lists according to all the channel addresses of each of the packets of different formats, and send the generated channel address lists to the network device.

5. The service access system according to claim 4, wherein the parsing device is configured to generate multiple authorized multicast address lists, wherein there are multiple user terminal devices, and one authorized multicast address list is obtained for only one user terminal device.

6. The service access system according to claim 4, wherein the parsing device is configured to generate multiple authorized multicast address lists, wherein there are multiple user terminal devices, the user terminal devices have plurality permissions, and only one authorized multicast address list is obtained for each permission.

* * * * *

UNITED STATES PATENT AND TRADEMARK OFFICE
CERTIFICATE OF CORRECTION

PATENT NO. : 8,813,115 B2  
APPLICATION NO. : 13/626689  
DATED : August 19, 2014  
INVENTOR(S) : Tu et al.

Page 1 of 1

It is certified that error appears in the above-identified patent and that said Letters Patent is hereby corrected as shown below:

On the Title Page, item (71) Applicant, "Guangdong (CN)" should read -- Shenzhen (CN) --.

Signed and Sealed this  
Sixth Day of January, 2015

Michelle K. Lee  
*Deputy Director of the United States Patent and Trademark Office*